April 20, 1965 W. SWAROFSKY 3,179,027
PHOTOGRAPHIC CAMERA WITH SETTING DEVICE
TO TAKE INTO ACCOUNT FILTER FACTORS
Filed Nov. 1, 1961 3 Sheets-Sheet 1

INVENTOR
WALTER SWAROFSKY

By Blum, Moscovitz,
Friedman and Blum

Attorneys

April 20, 1965         W. SWAROFSKY         3,179,027
PHOTOGRAPHIC CAMERA WITH SETTING DEVICE
TO TAKE INTO ACCOUNT FILTER FACTORS
Filed Nov. 1, 1961                      3 Sheets-Sheet 3

INVENTOR
WALTER SWAROFSKY

BY Blum, Moscovitz,
Friedman and Blum

Attorneys 3,179,027
PHOTOGRAPHIC CAMERA WITH SETTING DEVICE TO TAKE INTO ACCOUNT FILTER FACTORS
Walter Swarofsky, Braunschweig, Germany, assignor to Voigtlander A.G., Braunschweig, Germany, a corporation of Germany
Filed Nov. 1, 1961, Ser. No. 149,387
Claims priority, application Germany, Dec. 2, 1960, V 19,751
7 Claims. (Cl. 95—11)

This invention relates to photographic cameras of the type having an objective lens arranged to accommodate a light filter and including special setting means for adjusting exposure factor setting means to take into account the filter factor. More particularly, the present invention is directed to photographic cameras of this type including novel means for providing a positive and visually prominent indication whenever the special setting means has been operated to take into account a filter factor and has not been re-set.

In using cameras of this general type, when an exposure has been made using a filter and is followed either by an exposure made without a filter or by one made using a different filter, it can frequently happen that the photographer forgets either to cancel the filter factor adjustment introduced in the course of the preceding exposure where a filter was used, or to change this adjustment to correspond to the factor of the new filter. As a consequence, a poor exposure can be produced under the identical lighting conditions.

In accordance with the present invention, this possibility of taking a poor exposure due to failure to take into account the previous filter factor setting is avoided by providing an indicator which is strikingly visible to the photographer whenever the filter factor setting means has been operated to take into account the use of a filter. It will be appreciated that, to be effective, such an indicator must appear at a position relative to the camera where the photographer will automatically notice it before taking the next exposure. In further accordance with the invention therefore, this indicator is introduced into the field of view of the viewfinder whenever the filter factor mechanism is operated. As the photographer, prior to and during the taking of an exposure, always looks through the viewfinder to the object or scene to be photographed, the indicator, if then in the field of view of the viewfinder, will be immediately visible to the photographer and the latter thus will be advised of the fact that the camera has previously been adjusted to take into account a filter factor. The photographer thus will be automatically apprised that he should either remove the filter and re-set the filter factor adjusting means for "no filter," or should replace the filter with another filter and adjust the filter factor setting means to take into account the filter factor of such other filter.

The filter factor setting means can also be mechanically coupled with the mechanism of a rotating coil type of measuring instrument forming the indicating mechanism of an exposure meter. One appropriate form of mechanical coupling means comprises a tie rod, preferably a steel strip, which is connected to the filter factor setting means and to the rotatable portion of the movable coil instrument, as by means of being trained over pulleys. In such case, the aforementioned indicator can be actuated by the same tie rod or strip, as by means of a cam arrangement.

For an understanding of the principles of the invention, reference is made to the following description of typical embodiments thereof as illustrated in the accompanying drawings. In the drawings.

Figure 1:
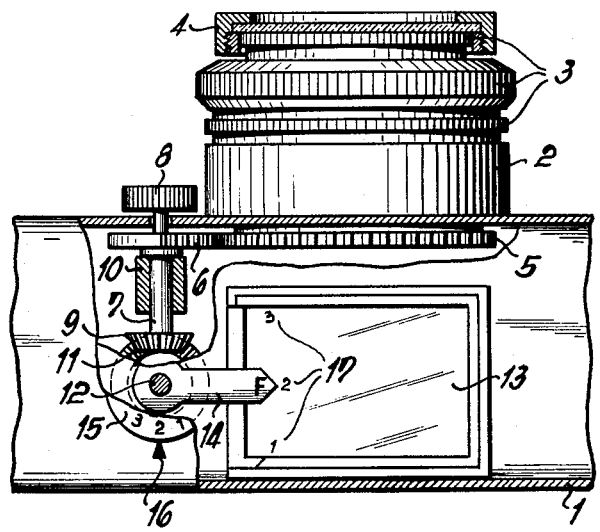
FIG. 1 is a partial plan view, partly in section, of a camera incorporating one embodiment of the invention, the filter factor setting means, and the indicator being illustrated in the positions occupied when the camera is being used with a filter and has been adjusted to take into account the filter factor.
Figure 2:
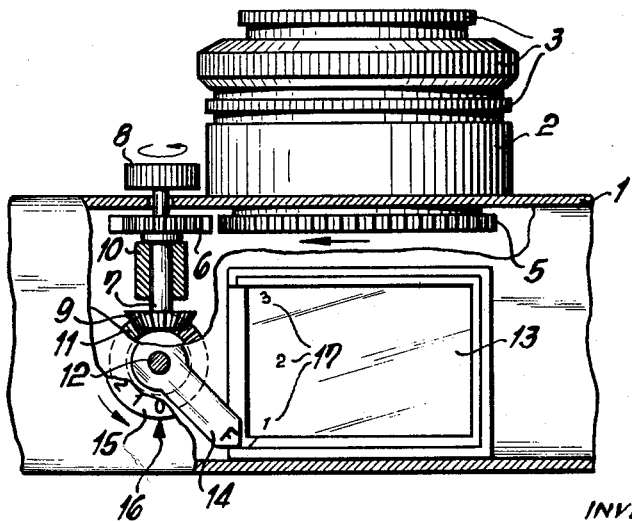
FIG. 2 is a view similar to FIG. 1, but illustrating the parts in the position they occupy when no filter is being used with the camera.
Figure 5:
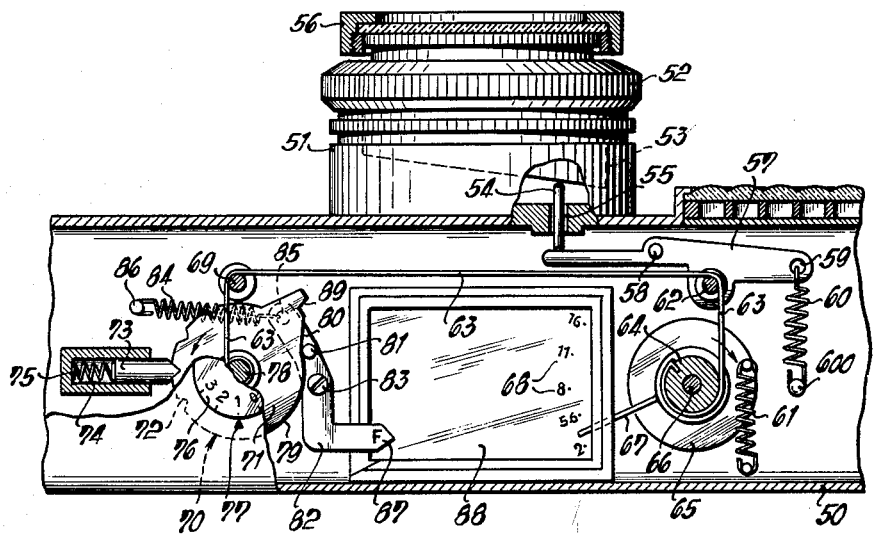
Figure 6:
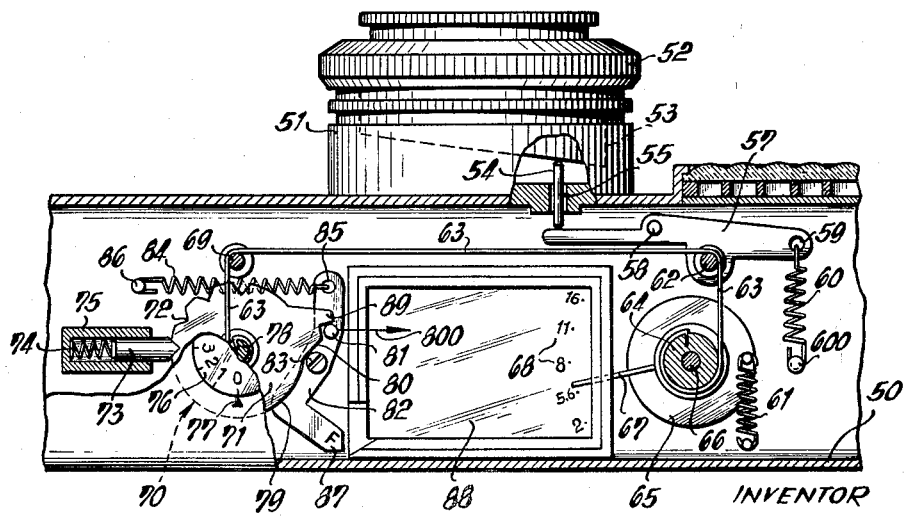

FIG. 5 is a partial plan view, partly in section, of a camera similar to that shown in FIGS. 1 and 2, but illustrating a further form of the invention indicator as associated with coupling means connecting the filter factor setting means to the rotatable coil of a measuring instrument, the indicator being shown in the position it occupies when the filter factor setting device has been set to take into account a filter factor; and FIG. 6 is a view corresponding to FIG. 5, but illustrating the parts when the filter factor setting device has been re-set to its "0" or "no filter" position.

Referring first to FIGS. 1 and 2, a camera is illustrated as including a housing or casing 1, an objective mount 2, and the usual exposure factor setting means 3, such as the shutter time setting ring, diaphragm aperture setting ring, etc. Objective 2 is illustrated as having a filter 4 mounted thereon in advance of its front lens and, when a filter is used with the camera, it is necessary to take into account the filter factor when adjusting the exposure factor setting means.

One of the exposure factor setting means 3, such as, for example, either the diaphragm aperture setting ring or the shutter time setting ring, is connected with a spur gear 5 within the camera casing 1, so that spur gear 5 is rotated in accordance with rotation of the exposure factor setting ring. A sector gear 6 secured on a shaft 7 is engageable with the spur gear 5, and shaft 7 has a filter factor setting knob 8 secured to its outer end and a bevel gear 9 secured to its inner end. Shaft 7 is rotatably mounted in a bearing 10 in casing 1, and bevel gear 9 meshes with a bevel gear 11 secured on a shaft 12 extending perpendicularly to shaft 7.

For illustrative purposes, the type of camera shown in FIGS. 1 and 2 is assumed to be a reflex camera having a transparent or translucent viewfinder plate 13 extending parallel to the bottom wall of the camera casing. Shaft 12 also has secured thereto an indicator 14 so that the latter is angularly adjustable in accordance with angular adjustment of shaft 12. The deflection range of indicator 14 is so selected that the indicator can project into the viewing area of the plate 13, and can also be completely displaced outside this viewing area. A filter factor scale disk 15 is secured to shaft 12 so that it may be set, with reference to a mark 16 on the outer surface of the upper wall of casing 1, by rotating knob 8.

In a known manner, the indications of scale disk 15 correspond to the filter extension factors of the various filters which may be secured to objective 2 in advance of the front lens thereof. The settings of disk 15 may be checked against a table, and frequently they can also be found imprinted in the respective filter. Numerals corresponding to the filter factors can also be provided on viewfinder plate 13, as indicated at 17. However, the spacing of numeral 17 must be so selected as to correspond to the range of movement of the individual stages of adjustment of the shutter time setter or the diaphragm aperture setter.

In FIG. 1, the filter factor scale 15 is illustrated as adjusted to a position wherein the filter factor indication "2" is opposite setting mark 16, this corresponding to the filter extension factor of the filter 4. In this case, indicator 14 projects into the field of view of viewfinder plate or window 13. However, in FIG. 2, the camera is illustrated as with filter 4 removed and the filter factor setter re-set so that the indication "0" is opposite mark 16. In this case, indicator 14 is completely outside the field of view of viewfinder plate 13. Also, at this "0" setting of disk 15, sector gear 6 is out of mesh with spur gear 5. Consequently, normal exposure condition setting can be effected by means of either the diaphragm ring or the shutter time ring and without use of filter factor setting knob 8.

Under the conditions of FIG. 2, the photographer looking through the viewfinder will not see indicator 14 and thus will be apprised that the filter factor setting device has been re-set and that he is taking an exposure utilizing only the time and diaphragm settings.

If it then appears that a filter 4 needs to be mounted before the next exposure, the extension factor of such a filter can be taken into account by rotating the knob 8 in the direction of the arrow of FIG. 2. This causes sector gear 6 to mesh with spur gear 5 while, at the same time, filter factor disk 15 is rotated in the direction of its associated arrow. Sector gear 6 then adjusts spur gear 5 to the degree indicated by the reading of scale 15 with respect to mark 16. Since, at the same time, indicator 14 is swung into the viewing area of viewfinder plate 13, by the operation of knob 8, its pointer F will be opposite one of the marks 17 corresponding to the setting of disk 15. The photographer can then see, in the viewfinder, whether or not the proper filter factor has been set. Thus, knob 8 can be operated while the photographer is sighting the camera using the viewfinder and without removing the camera away from his eye.

Where a change of exposure conditions occurs as between subsequent exposures, and irrespective of whether or not a filter is mounted or removed, it is necessary, in each case, to cancel the setting made to allow for the filter factors, either by actuating knob 8 or by actuating the diaphragm or time setting rings to an extent such that indicator 14 will move out of the field of view of viewfinder plate 13. When indicator 14 has been so moved out of the field of view of the viewfinder, sector gear 6 is disengaged from spur gear 5 and a new exposure condition setting may be effected as described.

Figure 3:
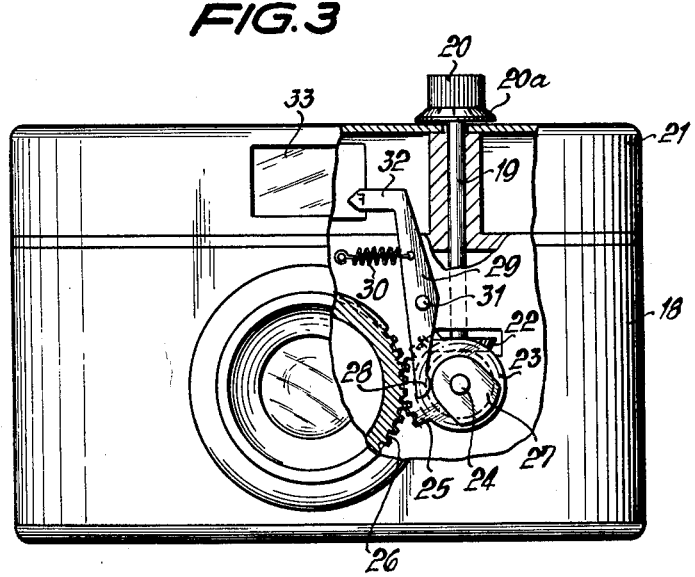
FIG. 3 is a front elevational view of another form of camera incorporating a modified form of the invention indicator, the indicator being illustrated in the position it occupies when a filter is being used with the camera and when the filter factor setting device has been operated to take into account the filter factor.

In the arrangement shown in FIG. 3, the indicator is visible, when the filter factor setting means has been operated, in the frosted or ground glass viewfinder of a camera having a casing 18. A shaft 19 is rotatably mounted in casing 18 and a setting knob 20 is secured to the upper end of shaft 19 so as to be positioned over the top wall or hood 21 of the camera. A bevel gear 22 is secured to the lower end of shaft 19 and meshes with a bevel gear 23 secured to a shaft 24 rotatably mounted in the camera and perpendicular to the shaft 19. A sector gear 25 is secured to shaft 24 or to the bevel gear 23 and, in certain positions, meshes with the spur gear 26 which is connected to one of the exposure condition setting rings, such as the diahpragm ring or the shutter time setting ring. A cam 27 is secured to shaft 24, and is engaged by the lower end 28 of a lever 29, or by a roller on the lower end of the lever 29. Lever 29 is pivotally mounted in the camera at 31, and a tension spring 30 biases the lever in a direction such that its lower end 28 is in continuous engagement with cam 27. By actuating knob 20, cam plate 27 is rotated in such a way that it will either permit the indicating end 32 of indicator 29 to project into the field of view through the frosted glass finder plate 33, or will operate indicator 29 so that its indicating end 32 is withdrawn from the field of view of viewfinder plate 33.

In the embodiment of FIG. 3, the filter factor extension scales are provided on a scale disk 20a, which is secured to a setting knob 20 and is adjustable with respect to a fixed mark located on the upper surface of the camera casing or hood 21. The viewfinder can be designed, in a known manner, so that the photographer looking at screen 33 will observe both the tip "F" of the indicator end 32 and the correspondingly dimensioned numerical scale of the filter extension factors. This may be effected by means of a conventional focusing device so that the scale and the indicator end 32 may be seen clearly in the finder field, or appear to be on if not within a known type of image defining frame.

Figure 4:
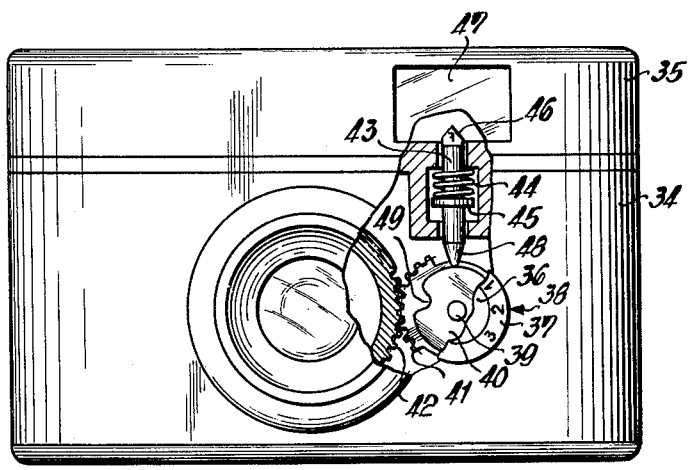
FIG. 4 is a view similar to FIG. 3 illustrating a further form which the indicator may take in practice.

FIG. 4 illustrates a camera generally similar to that shown in FIG. 3 and comprising a casing 24 and a hood 35. In this case, the filter factor setting means is provided with a setting knob 36 on the front wall of the camera and carrying a scale disk 37 adjustable with respect to a fixed mark 38 in setting or taking into account the filter factor. Knob 36 is secured to a shaft 39, rotatably mounted in casing 34, and shaft 39 has cam plate 40 and a sector gear 41 secured to rotate therewith. Sector gear 41 is arranged to selectively mesh with a spur gear 42 which is again coupled for rotation with one of the exposure factor setting rings. A pin 43 is slidably mounted in casing 34 and is biased toward cam 40 by a spring 44 engaging a collar 45 on the pin and a portion of the camera body. The upper end of pin 43 is formed as an indicator 46 arranged to project into the field of view of a finder 47 mounted in hood 35.

When scale disk 37 is in its zero position, where no account is taken of any filter extension factor, the lower end 48 of pin 43, which is conical and has a rounded tip, engages a recess 49 in cam 40 so that the indicator end 46 of pin 43 moves outside the image field of the finder. If setting knob 36 is operated to adjust the diaphragm aperture setting ring or the shutter time setting ring an additional amount, thus moving the scale disk 37 away from its zero position to account for the extension factor of a light filter mounted on the objective, end 48 of pin 43 rides out of recess 49 and into engagement with the periphery of cam 40. Pin 43 is therefore moved upwardly against the bias of spring 44 so that its indicating end 46 projects into the image field or the field of view of finder 47.

In the embodiment of the invention shown in FIGS. 5 and 6, a camera housing 50 is illustrated as having an objective lens 51 mounted thereon and provided with a shutter. Lens mount 51 is provided, in the usual manner, with various knurled rings for setting of the diaphragm aperture, the shutter time, and distance, and including a ring 52 for setting the shutter time. Ring 52 has coupled thereto a cam 53 engaging a pin 54 slidably mounted in a bore 55 of the housing 50. In FIG. 5, a filter 56 is illustrated as mounted on the objective lens mount 51.

The inner end of pin 54 engages one arm of a lever 57 pivoted at 58 in housing 50. The other arm of lever 57 has, adjacent its outer end, an aperture or eye 59 in which is hooked one end of a spring 60 whose opposite end is fixedly connected to the camera housing, as by a bolt or pin 600. Spring 60 acts to bias lever 57 clockwise, as viewed in FIGS. 5 and 6, so as to maintain the left arm of the lever engaged with pin 54 and thus to maintain pin 54 in engagement with cam 53. A bolt or pin 62 is rotatably mounted in the lever 57 and a tie rod, such as a steel band or strip 63, extends over the pin or bolt 62. One end of tie rod 63 is connected to the rotatable part 64 of a rotatable coil measuring instrument 65 forming part of an exposure meter and having an indicator 67 projecting into the field of view of the finder 88. The camera may be a reflex camera, and the viewing screen 88 may have a scale 68 thereon which is calibrated in diaphragm aperture values, or diaphragm aperture scale 68 may be focused into the field of view of the finder. Element 64 is rotatably mounted on a pin 66 so that it is angularly adjustable bodily relative to the camera housing 50, and a spring 61 tends to rotate element 65 bodily in the direction of the arrow shown in FIG. 5.

Tie rod 63 is trained over a pin or bolt 69 which is rotatably mounted in housing 50, and the opposite end of the tie rod is secured to a rotatable filter factor setting device generally indicated at 70. Device 70 includes a cam plate 71 formed with plural detent notches 72 arranged to cooperate with a detent pin 73 slidably mounted in a housing 75 and biased into engagement with cam plate 71 by a spring 74. Device 70 also includes a scale disk 76 carrying indications of the individual filter extension factors, and scale disk 76 is cooperable with a fixed mark 77. Scale disk 76 is rigidly secured with the cam plate 71, and both of these elements are angularly adjustable relative to camera housing 50.

The bearing means for cam 71 and disk 76 comprises a bolt 78 having the end of the tie rod 63 secured thereto, and bolt 78 is rotatable in the camera housing 50. When cam 71 and scale 76 are rotated in the direction of the arrow shown in FIG. 5, the tie rod or strip 63 is wound on the shaft or bolt 78. The resulting tension on the tie rod 63 rotates the moving coil instrument 65 of the exposure meter.

At a point of its periphery nearly opposite that part formed with the detent notches 72, cam plate 71 engages a bolt or roller 81 on an indicator lever 82 pivoted on a bolt 83 in housing 50 and biased by a tension spring 84 in a direction such as to maintain bolt 81 in engagement with cam plate 71. One end of spring 84 is hooked into an eye or aperture 85 near the upper end of indicator lever 82, and the other end of spring 84 is secured to a bolt or pin 86 fixedly mounted in the camera housing. Lever 82 has an indicator end 87 extending at an angle to the general length of the lever, and indicator end 87 projects into the field of view of finder 88 when cam plate 71 is positioned to adjust for a filter factor. Where no filter factor is introduced into the camera setting, bolt or roller 81 of lever 82 engages a detent edge or projection 89 of cam plate 71, preventing further rotation of scale disk 76 in a direction opposite to that of the arrow shown in FIG. 5. In this position of the parts, indicator end 87 is outside the field of view of finder 88, as shown in FIG. 6.

It should be noted that cam 53, instead of being coupled with shutter time setting ring 52, can equally well be coupled with either the diaphragm aperture setting ring or the film sensitivity adjusting ring. Coupling of cam 53 to the shutter time setting ring is particularly effective in automatic cameras where shutter time values are pre-selected and diaphragm apertures values, corresponding to a given exposure condition, are set automatically in accordance with the shutter time setting and such exposure condition.

In FIG. 6, the parts are indicated in the position they occupy when the camera has not been adjusted in accordance with a filter factor. It will be noted that the "0" indication of scale disk 76 is opposite mark 77 on the upper wall of the camera hood, and roller 81 of lever 82 is pressed by cam portion 80 of cam plate 71 in the direction of arrow 800 (FIG. 6) so that lever 82 is pivoted, against the bias of spring 84, so that the indicator portion 87 is retracted from the viewing area of viewfinder 88.

The arrangement of FIGS. 5 and 6 operate as follows. Upon rotation of the shutter time setting ring 52, cam 53 effects axial adjustment of pin 54. It will be assumed that setting ring 52 is moved in a such a manner that pin 54 is moved inwardly relative to the camera housing. In this case, lever 57 is swung counterclockwise so that roller 62 moves further away from shaft 66 of instrument 65. Thus, the moving coil instrument 65 is rotated so that indicator 67, which projects into the viewing area of the finder 88, provides a visible indication of the setting of ring 52 and cam 53. An additional rotation of the moving coil instrument 65 occurs when cam plate 71 is rotated for the purpose of taking into account a filter factor. This causes a further movement of tie rod 63 to the left, so that instrument 65 is adjusted to indicate a higher diaphragm aperture value. Additionally, and due to the rotation of cam plate 71, indicator lever 82 is swung to a position wherein its indicator point 87 extends into the field of view of viewfinder 88.

As the arrangement of FIGS. 5 and 6 is particularly suited for use in an automatic camera, the moving coil instrument 65 may be coupled with a scanning device comprising part of an automatic exposure control system, such a scanning device being, for example, one which will scan any given position of the exposure meter indicator.

It is apparent, therefore, that with the structure of FIGS. 5 and 6 an objective means 51 is provided for detachably carrying the filter 56. The element 52 forms an exposure factor adjusting means which acts through a transmission means on the instrument 65, which is supported for rotary movement in its entirety, to adjust the angular position of the instrument 65 in accordance with the setting of the exposure factor adjusting means 52, and this latter transmission means includes the cam 53, the pin 54, the lever 57, and the elongated flexible element 63 which is moved, upon turning of lever 57, as the result of the displacement of the roller 62 with the lever 57 about the pivot 58 thereof. In this way, the angular position of the instrument 65 will take into account the setting of the exposure factor adjusting means 52. The filter factor setting device, which includes the scale disk 76 and the manually turnable shaft 78 also acts through a transmission on the meter 65 further to determine the angular position thereof, and this latter transmission is formed by the portion of the elongated flexible element 63 which is guided around the roller 69 and is fixed to the shaft 78, so that in this way this latter transmission means will provide a further adjustment of the angular position of the instrument 65 according to the manual setting of the filter factor setting device. This filter factor setting device is, of course, operatively connected with the indicator 87 through the cam 71 and the lever 82 for displacing the indicator 87 into the position of FIG. 5 where it is visible in the viewfinder when any filter factor has been set, whereas if no filter factor is set with the filter factor setting device, then the indicator 87 is completely beyond the field of view of the viewfinder 88, as is apparent from FIG. 6.

While specific embodiments of the invention have been shown and described in detail to illustrate the application of the principles of the invention, it will be understood that the invention may be embodied otherwise without departing from such principles.

What is claimed is:

1. In a camera, objective means for detachably carrying a filter which can be mounted on said objective means at the option of the operator, exposure factor adjusting means operatively connected to said objective means for adjusting the latter to determine the extent to which film in the camera will be exposed, a rotary light meter in the form of a moving coil instrument supported in its entirety for rotary movement, transmission means extending between and operatively connected to said exposure factor adjusting means and said instrument for providing the latter with an angular position in accordance with the setting of said exposure factor adjusting means, manually operable filter factor setting means movable from a position indicating no filter carried by said objective means to a selected one of a plurality of positions corresponding to a filter carried by said objective means, transmission means connecting said filter factor setting means to said rotary instrument for further angularly adjusting the same by operation of said setting means, a viewfinder, an indicator, and means actuated by said filter factor setting means and operatively to said indicator for displacing said indicator to a position where it is visible in said viewfinder when said filter factor setting means is set at a selected position corresponding to a filter carried by said objective means and situating said indicator in a position where it is not visible in said viewfinder when said filter factor setting means is set at said position indicating that no filter is carried by said objective means.

2. In a camera, as claimed in claim 1, in which said transmission means between said filter factor setting means and said instrument comprises an elongated flexible element connected at one end to said setting means and at the other end to said movable coil instrument and extending over roller means mounted in the camera.

3. In a camera, as claimed in claim 2, said exposure factor adjusting means comprises a ring rotatably mounted on said objective means, said transmission means which extends between said exposure factor adjusting means and said instrument including a cam rotatable with said ring; a relatively elongated lever pivotally mounted intermediate its ends in said camera; a pin slidably mounted in the camera and having one end engaging said cam and the other end engaging one end of said lever; a spring secured between the opposite end of said lever and a portion of the camera and biasing said lever in a direction to maintain said one end thereof engaged with said pin and said pin engaged with said cam; said roller means including a roller rotatably mounted on said lever in radially spaced relation to the pivotal axis of said lever; spring means biasing said instrument in a direction to maintain tension on said elongated flexible element; whereby, when said lever is swung against the action of its biasing spring by movement of said cam during adjustment of said ring, said roller will be moved away from said instrument so that said flexible element will adjust said instrument in a direction corresponding to the direction of adjustment of said ring.

4. The improvement in a photographic camera, as claimed in claim 3, in which said moving coil instrument includes an indicator element visible in the field of view of said viewfinder.

5. In a camera, as claimed in claim 1, said filter factor setting means including a scale disk and a cam plate rotatable with said scale disk and having detent notches in its periphery positioned in accordance with the several filter factors to be set and cooperable with spring biased detent means mounted in said camera.

6. In a camera, as claimed in claim 5, in which said indicator is an end portion of an indicator lever pivotally mounted in the camera and having said end portion movable relative to the field of view of said viewfinder; a cam follower on said indicator lever cooperable with said cam plate; and spring means biasing said indicator lever to maintain said cam follower engaged with said cam plate; said indicating end portion of said indicator lever being extended into said field of view when said detent means is engaged with any one of said detent notches in said cam plate.

7. In a camera as recited in claim 1, both of said transmission means including an element which is common to both of said transmission means and which is operatively connected to said instrument for changing the angular position thereof when either one of said transmission means is actuated.

References Cited by the Examiner
UNITED STATES PATENTS

| | | | |
|---|---|---|---|
| 2,952,195 | 9/60 | Babcock | 95—11 |
| 2,969,004 | 1/61 | Gebele | 95—10 |
| 2,975,693 | 3/61 | Ort | 95—64 |
| 3,005,390 | 10/61 | Hahn | 95—10 |

NORTON ANSHER, *Primary Examiner.*

JOHN M. HORAN, *Examiner.*